Nov. 13, 1923.
S. CHAKOV
HANDLE
Filed Feb. 1, 1922
1,473,922
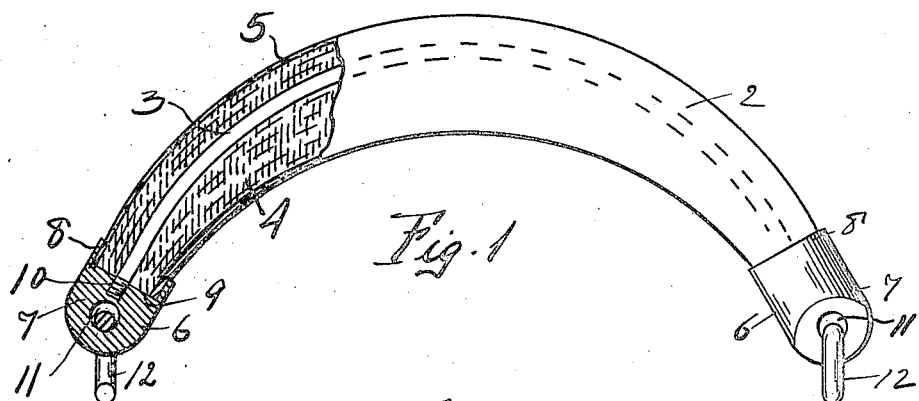
Fig. 1
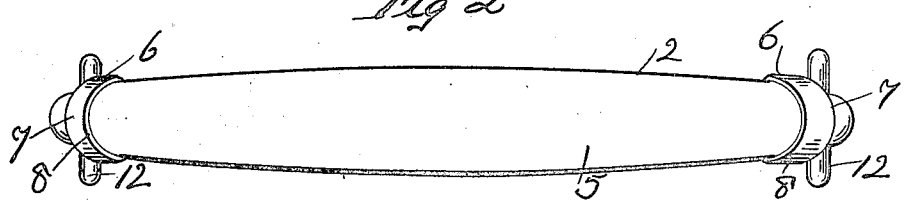
Fig. 2
Fig. 3
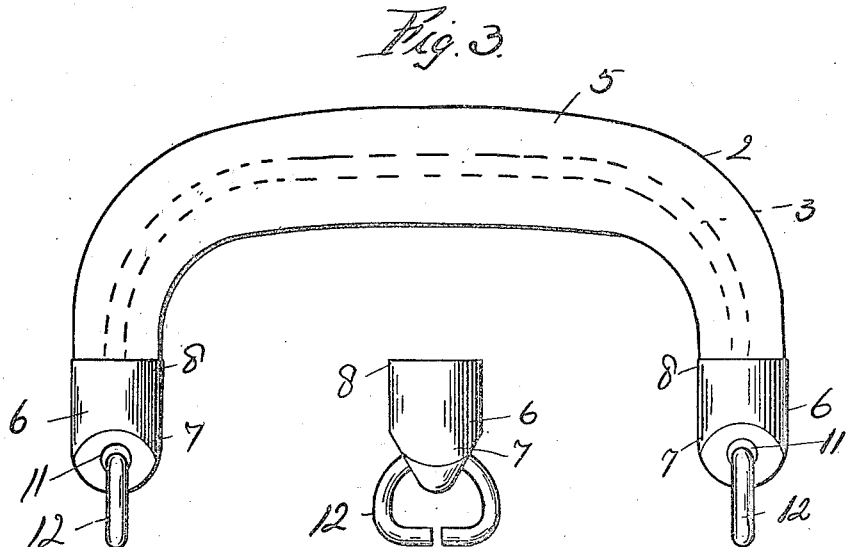
Fig. 4
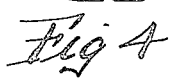
INVENTOR
Sievel Chakov
By W. W. Williamson Atty.

Patented Nov. 13, 1923.

1,473,922

UNITED STATES PATENT OFFICE.

SIEVEL CHAKOV, OF PHILADELPHIA, PENNSYLVANIA.

HANDLE.

Application filed February 1, 1922. Serial No. 533,346.

*To all whom it may concern:*

Be it known that I, SIEVEL CHAKOV, a citizen of the United States, residing at Philadelphia, in the county of Philadelphia and State of Pennsylvania, have invented new and useful Improvements in a Handle, of which the following is a specification.

My invention relates to new and useful improvements in a handle such as is used on traveling bags, suit cases, tool boxes or trunks and the like, and has for its object to provide a ring holding cap at each end of the handle having threaded connection with the wire core or stiffening member.

In the ordinary construction of handles of this character the ends of the strengthening or stiffening wire are bent to form loops during the manufacture thereof and the leather covering folded thereabout and then secured in place. Considerable time is required in the formation of the loops and completion of the ends of the handles and when in use the covering is soon worn away and the loops often bent out of shape so that the rings finally become separated from the handle.

These disadvantages are entirely overcome by constructing a handle in accordance with my invention as the caps may be readily and quickly threaded onto the projecting ends of the stiffening wire which is the core of the handle and there is little likelihood of the caps pulling away from the stiffening wire. Further as the rings are not in contact with the handle covering the latter will not become worn and frayed and since the ends of the covering are enclosed in the caps a handle of much neater appearance is produced.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawing forming a part of this application, in which:—

Fig. 1, is a side elevation of a handle constructed in accordance with my invention, one end of said handle being broken away and shown in section to clearly illustrate the details of construction.

Fig. 2, is a plan view thereof.

Fig. 3, is a side elevation of a differently shaped handle embodying my invention.

Fig. 4, is a side elevation of one of the caps and its ring removed from the hand hold portion of the handle, the view being at right angles to the position of the caps shown in Fig. 3.

In carrying out my invention as here embodied, 2 represents the hand hold portion of a handle constructed in accordance with my invention and may be of any desirable size or shape such as is shown in Figs. 1 and 3 according to the object or article with which the handle is to be used or according to the preference of the manufacturer of such objects as suit cases, traveling bags, trunks and the like.

The hand hold portion consists principally of a strengthening or stiffening wire 3 which is embedded within the filler 4 of paper or other suitable material, the latter being enclosed within a cover 5 of any suitable material such as leather. The stiffening wire 3 follows the general contour of the hand hold portion with its ends, which are threaded, projecting beyond the ends of the hand hold portion as may be readily ascertained by reference to that portion of Fig. 1 which is shown in section.

The reference numeral 6 denotes a cap produced from any suitable material and which may be of any desired size or preferred configuration consisting of a solid body portion 7 having an annular flange 8 projecting therefrom which when in position encloses the end of the hand hold, said flange forming a recess 9 for the reception of an end of said hand hold. Within the body is formed a threaded hole 10 communicating with the recess 9 and adapted to register with the projecting end of the stiffening wire 3 so that the cap has direct threaded connection with said stiffening wire. The cap is also provided with a hole 11 for the reception of the split ring 12 by which the handle is connected to the clips or loops carried by the traveling bag, suit case or other object.

In practice the hand hold portions of the handle may be constructed in any suitable or well known manner or of any shape as will be obvious from Figs. 1 and 3, and as the ends of the stiffening wire 3 do not have to be bent nor the ends of cover and filler folded over or tucked in considerable time and labor is saved in the production of the hand hold portions and when said parts are completed it is a very simple and quick operation to thread the caps upon the projecting ends of the stiffening wire to complete the handle.

Of course I do not wish to be limited to the exact details of construction as herein shown as these may be varied within the limits of the appended claims without departing from the spirit of my invention.

Having thus fully described my invention, what I claim as new and useful is:—

1. A handle comprising a hand hold portion having a stiffening wire embedded therein with its ends projecting from the ends of the hand hold portion, caps each consisting of a body portion having a ring hole therethrough, and a threaded hole for registration with the projecting ends of the stiffening wire which are also threaded, and an annular flange projecting from the body and producing a recess for the reception of the ends of the hand hold portion, and split rings mounted in the ring holes.

2. A handle of the class described comprising in combination, a stiffening wire having threaded ends, a filler in which said wire is embedded, a cover enclosing said filler, the threaded ends of the stiffening wire projecting beyond said filler and cover, caps having threaded holes to receive the projecting ends of said stiffening wire and provided with means enclosing the ends of the cover, and rings connected with said caps.

3. The combination with a handle including a hand hold portion and a stiffening wire embedded therein with its ends projecting from the ends of said hand hold portion, said projecting ends having screw threads thereon, of caps having a threaded central hole for threaded engagement with the projecting ends of the stiffening wire and further provided with an annular flange surrounding and enclosing the ends of the hand hold portion.

In testimony whereof I have hereunto affixed my signature.

SIEVEL CHAKOV.